US 9,279,071 B2

(12) United States Patent
Tapsak

(10) Patent No.: US 9,279,071 B2
(45) Date of Patent: Mar. 8, 2016

(54) ADHESIVES AND METHODS FOR THEIR MANUFACTURE AND USE

(71) Applicant: EMPIRE TECHNOLOGY DEVELOPMENT LLC, Wilmington, DE (US)

(72) Inventor: Mark Allen Tapsak, Orangeville, PA (US)

(73) Assignee: Empire Technology Developent LLC, Wilmington, DE (US)

( * ) Notice: Subject to any disclaimer, the term of this patent is extended or adjusted under 35 U.S.C. 154(b) by 0 days.

(21) Appl. No.: 14/566,138

(22) Filed: Dec. 10, 2014

(65) Prior Publication Data

US 2015/0094442 A1 Apr. 2, 2015

Related U.S. Application Data

(62) Division of application No. 13/520,876, filed as application No. PCT/US2012/030575 on Mar. 26, 2012, now Pat. No. 8,937,140.

(51) Int. Cl.

| C08G 63/668 | (2006.01) |
| C09J 167/02 | (2006.01) |
| C08G 63/12 | (2006.01) |
| C08G 63/16 | (2006.01) |
| C08G 63/52 | (2006.01) |
| C08G 63/82 | (2006.01) |
| C09J 167/00 | (2006.01) |

(52) U.S. Cl.
CPC .......... *C09J 167/025* (2013.01); *C08G 63/668* (2013.01); *C09J 167/00* (2013.01)

(58) Field of Classification Search
None
See application file for complete search history.

(56) References Cited

U.S. PATENT DOCUMENTS

| 3,153,036 | A | * | 10/1964 | Merten et al. | 536/117 |
| 3,359,241 | A | * | 12/1967 | Dobinson | 528/285 |
| 3,382,217 | A | * | 5/1968 | Case | 527/315 |
| 3,483,169 | A | * | 12/1969 | Case et al. | 527/311 |
| 5,618,933 | A | * | 4/1997 | Dordick et al. | 536/115 |
| 5,648,483 | A | * | 7/1997 | Granberg et al. | 536/119 |
| 5,714,570 | A | * | 2/1998 | Kim et al. | 528/279 |
| 5,872,199 | A | * | 2/1999 | Bloembergen et al. | 526/238.2 |
| 6,242,593 | B1 | * | 6/2001 | Bloembergen et al. | 536/123.1 |
| 6,252,027 | B1 | | 6/2001 | Mihara et al. | |
| 6,268,413 | B1 | * | 7/2001 | Columbus et al. | 524/47 |
| 6,384,243 | B1 | | 5/2002 | Brunerie | |
| 6,613,378 | B1 | * | 9/2003 | Erhan et al. | 426/658 |
| 6,972,315 | B2 | | 12/2005 | Gross et al. | |

(Continued)

FOREIGN PATENT DOCUMENTS

| EP | 987284 A1 * | 3/2000 | ........ C08G 63/668 |
| EP | 1382435 A1 * | 1/2004 | ........ B29C 67/24 |

(Continued)

OTHER PUBLICATIONS

International Search Report and Written Opinion for PCT/US2012/030575 dated May 30, 2012.

(Continued)

*Primary Examiner* — Peter A Salamon
(74) *Attorney, Agent, or Firm* — Pepper Hamilton LLP

(57) ABSTRACT

A composition composed of an adhesive copolymer may be a reaction product of a first mixture and a monosaccharide monomer, in which the first mixture may be a reaction product of a diol monomer and a dicarboxylic monomer.

21 Claims, 4 Drawing Sheets

(56) References Cited

U.S. PATENT DOCUMENTS

| | | |
|---|---|---|
| 7,186,789 B2 | 3/2007 | Hossainy et al. |
| 7,301,001 B2 | 11/2007 | Hossainy et al. |
| 7,312,299 B2 | 12/2007 | Hossainy et al. |
| 7,534,917 B1 | 5/2009 | Ngo et al. |
| 7,592,002 B2 * | 9/2009 | Gupta ................ 424/70.13 |
| 8,937,140 B2 * | 1/2015 | Tapsak .................. 527/311 |
| 2004/0019178 A1 | 1/2004 | Gross et al. |
| 2004/0253203 A1 * | 12/2004 | Hossainy et al. ........ 424/78.08 |
| 2007/0100123 A1 | 5/2007 | Hossainy et al. |
| 2007/0123689 A1 | 5/2007 | Hossainy et al. |
| 2008/0194771 A1 * | 8/2008 | Kong et al. ............ 525/419 |
| 2011/0015385 A1 | 1/2011 | Timmermans et al. |
| 2011/0319504 A1 * | 12/2011 | Koskimies et al. ........ 514/785 |

FOREIGN PATENT DOCUMENTS

| | | |
|---|---|---|
| EP | 0987284 B1 | 12/2004 |
| JP | 2000297205 A | 10/2000 |
| JP | 2007501893 A | 2/2007 |
| WO | WO2005/000939 A1 | 1/2005 |

OTHER PUBLICATIONS

Boenig, Unsaturated Polyesters: Structure and Properties, Chapter 6, Elsevier Publishing Company (1964).

Warwel et al., Polyesters of ω-Unsaturated Fatty Acid Derivatives, *Macromol. Chem. Phys.* (2001), 202:1114-1121.

* cited by examiner

ADHESIVES AND METHODS FOR THEIR MANUFACTURE AND USE

CROSS-REFERENCE TO RELATED APPLICATIONS

This application is a divisional application under 35 U.S.C. §121 of U.S. application Ser. No. 13/520,876, filed on Jul. 6, 2012, now U.S. Pat. No. 8,937,140 and entitled "Adhesives and Methods for Their Manufacture and Use," which is a U.S. national stage filing under 35 U.S.C. §371 of International Application No. PCT/US2012/030575, filed on Mar. 26, 2012, entitled "Adhesives and Methods for Their Manufacture and Use." The disclosures of each of the foregoing are incorporated by reference in their entireties.

BACKGROUND

There is great interest in replacing petroleum-based chemicals with bio-derived feedstocks, thereby producing "green" products. Such products may take advantage of renewable resources, as well as decrease manufacturing reliance on petrochemicals. Examples of green products may include inks and adhesives, including, as an example, a soy-protein based formaldehyde-free plywood adhesive. However, green products, in general, are not well represented in the adhesives or coatings markets.

Large-scale manufacturing of bio-derived feedstocks requires a significant market size to justify the development of biofuel processing facilities. The combined adhesives and packaging industry is third behind textiles and cosmetics. Therefore, the development of bio-derived adhesives could greatly expand the market need for producers of bio-derived feedstocks, such as C5 and C6 sugars.

It is therefore desirable to develop adhesive materials based on C5 and/or C6 sugars to permit increased market penetration for biofuel manufacturers.

SUMMARY

In an embodiment, a composition may be composed of an adhesive copolymer that is a reaction product of a first mixture and a monosaccharide monomer. The first mixture may be a reaction product of a diol monomer and a dicarboxylic monomer. Further, the dicarboxylic monomer and the diol monomer in the first mixture and the monosaccharide monomer are at a mole percent ratio of the dicarboxylic monomer to a total of the monosaccharide monomer and the diol monomer of about 85:15 to about 65:35.

DETAILED DESCRIPTION

Carbohydrate based copolymer adhesives may be prepared from starches derived from food grade commodities such as corn. Typically, modifiers derivable from petroleum based sources, such as formaldehyde, polyvinyl alcohol, m-phenylenediamine, and triethylenetetramine, may be added. These additives may be viewed by some as potentially toxic. Additionally, production of such adhesives may still depend upon petroleum feedstocks.

The copolymers and methods of producing them, as disclosed below, are directed to the use of biologically derivable feedstocks, primarily C5 and/or C6 monosaccharides, cross-linked by dicarboxylic monomers. Additional components, such as biologically derived diols, may be added as chain lengthening agents to the dicarboxylic monomers. The adhesive properties, tensile strength, plasticity, and hardness of the copolymers may be controlled by the ratio of dicarboxylic monomers to saccharides in preparing the copolymers. The copolymers may also be readily biodegradable and food safe. As such, the copolymers may be good candidates for use as adhesives on paper and cardboard food containers.

Figure 1A:
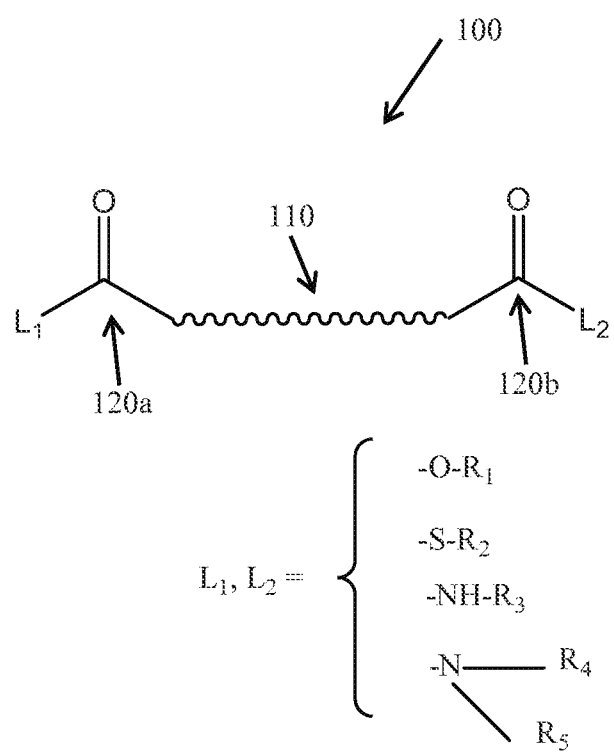
FIG. 1a illustrates a schematic of a dicarboxylic monomer in accordance with the present disclosure.

For the purpose of this disclosure, a "dicarboxylic monomer" may be defined according to the structure illustrated in FIG. 1a. The dicarboxylic monomer 100 may comprise at least a pair of carboxyl ends, 120a and 120b containing a carbonyl group having a carbon-oxygen double bond. Further, the carboxyl ends may be joined by an intermediate component 110. Each carboxyl end may further be conjugated to a leaving group, for example, the groups in FIG. 1a designated as $L_1$ (to carboxyl end 120a) and $L_2$ (to carboxyl end 120b). Leaving groups $L_1$ and $L_2$ may independently include an —O—$R_1$, an —S—$R_2$, an —NH—$R_3$, or an —N($R_4$)($R_5$) group. Leaving group $L_1$ may be the same type of leaving group as $L_2$, although the two groups may also be different types of groups or different groups. It is therefore understood that a dicarboxylic monomer may comprise at least a pair of carboxyl ends, in which each carboxyl end may be conjugated to a leaving group thereby forming at least one or more of an ester, a thioester, a primary amide, or a secondary amide bond.

Groups $R_1$-$R_5$ may comprise any of a number of organic substituents, including, but not limited to, aliphatic groups and aromatic groups. In one embodiment, either one or both of the leaving groups may include an O-aliphatic group, an O-aromatic group, an S-aliphatic group, an S-aromatic group, an N-primary amine group, or an N-secondary amine group. In one embodiment, the dicarboxylic monomer may be a dicarboxylic acid monomer. In one embodiment, the dicarboxylic monomer may be an α,ω-dicarboxylic acid monomer. In another embodiment, the dicarboxylic monomer may be a dicarboxylic acid ester monomer. In yet another embodiment, the dicarboxylic monomer may be a dicarboxylic acid methyl ester monomer. In still another embodiment, the dicarboxylic monomer may be an α,ω-dicarboxylic acid methyl ester monomer. In another embodiment, either one or both of the leaving groups may include a hydroxyl group, a methoxy group, an ethoxy group, a butoxy group, an isobutoxy group, a propoxy group, an isopropoxy group, a phenoxy group, a methyl sulfide group, an ethyl sulfide group, a butyl sulfide group, an isobutyl sulfide group, a propyl sulfide group, an isobutyl sulfide group, a phenyl sulfide group, a methyl amine group, an ethyl amine group, a butyl amine group, an isobutyl amine group, a propyl amine group, an isopropyl amine group, an N,N-dimethyl amine group, an N,N-di-ethyl amine group, an N,N-dibutyl amine group, an N,N-di-isobutyl amine group, an N,N-dipropyl amine group, or an N,N-di-isopropyl amine group.

The intermediate component of a dicarboxylic monomer may include a variety of organic groups including linear chain and branched chain groups. In one embodiment, the intermediate component may include an unsaturated linear chain. In another embodiment, the intermediate component may include a mono-unsaturated chain or a poly-unsaturated chain. In some embodiments, the liner chain may comprise "n" carbon atoms, where "n" may be an integer from about 12 to about 34. In some embodiments, "n" may be an integer from about 16 to about 20. In still another embodiment, "n" may be about 18. The integer can be an even number or an odd number. Examples of even number include 12, 14, 16, 18, 20, 22, 24, 26, 28, 30, and ranges between any two of these values. Examples of odd numbers include 13, 15, 17, 19, 21, 23, 25, 27, 29, and ranges between any two of these values.

Figure 1B:
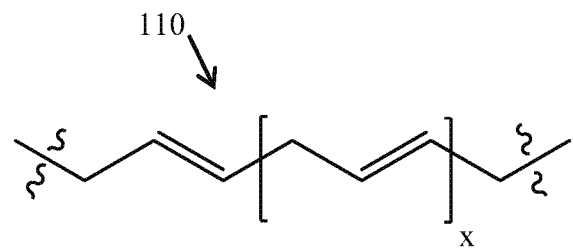
FIGS. 1b and 1c illustrate embodiments of components of a dicarboxylic monomer in accordance with the present disclosure.

FIG. 1b illustrates an embodiment of a poly-unsaturated linear chain intermediate component 110 of a dicarboxylic monomer that may include a propenyl repeat section within the linear chain. The propenyl moiety may be repeated "x" times within the repeat section, where "x" may be an integer from 0 to about 4. In some embodiments, "x" may be 0, 1, 2, 3, or 4.

The intermediate component may also include lengths of straight chain alkane moieties attached at either one or both ends of the propenyl repeat section. In one embodiment, an alkane moiety may have about 1 to about 14 carbons. In another embodiment, an alkane moiety may have about 7 to about 11 carbons. In still another embodiment, an alkane moiety may have about 9 carbons. Specific examples of the number of carbons include 1, 2, 3, 4, 5, 6, 7, 8, 9, 10, 11, 12, 13, 14, and ranges between any two of these values. It is understood that an alkane moiety attached at a first end of the propenyl repeat section may have the same number of carbons as an alkane moiety attached at the second end of the propenyl repeat section. Alternatively, the alkane moiety attached at a first end of the propenyl repeat section may have a different number of carbons than the alkane moiety attached at the second end of the propenyl repeat section.

Figure 1C:
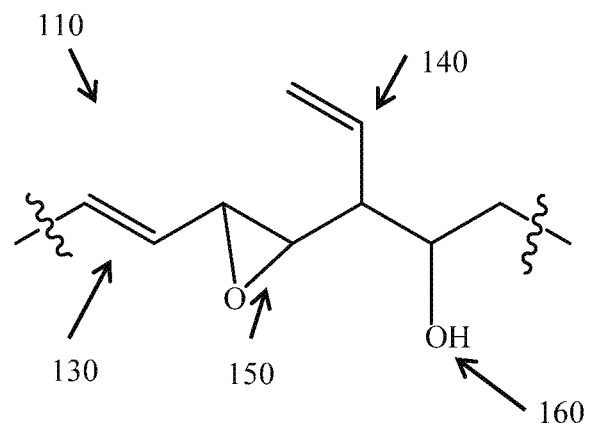

FIG. 1c illustrates another embodiment of an intermediate component 110. The intermediate component may include any number or distribution of unsaturated carbon-carbon double bonds along a linear chain, 130. The intermediate component may further include one or more functional groups including, without limitation, an epoxy group 150, an alcohol group 160, or a pendant vinyl group 140. The intermediate component of a dicarboxylic monomer may include any or all of these groups, or other functional groups.

It may be appreciated that the stereo-isomeric configuration about any one of the carbon-carbon double bonds of a dicarboxylic monomer may have a cis configuration or a trans configuration (or alternatively stated, E- or Z-configuration). A poly-unsaturated dicarboxylic monomer may include cis isomers at all carbon-carbon double bonds, trans isomers at all carbon-carbon double bonds, or a combination of cis isomers at some carbon-carbon double bonds and trans isomers at the other carbon-carbon double bonds.

In anticipation of material disclosed below, it may be appreciated that, while "a dicarboxylic monomer" may be disclosed, the dicarboxylic monomer may comprise a mixture of dicarboxylic monomers as disclosed above.

In addition to the dicarboxylic monomers, the copolymer may also be prepared using one or more monosaccharides, including pentose (C5) sugars, hexose (C6) sugars, or a combination of hexose and pentose sugars. Embodiments of monosaccharides may include, without limitation, allose, altrose, glucose, mannose, gulose, idose, galactose, talose, psicose, fructose, sorbose, tagatose, arabinose, lyxose, ribose, xylose, ribulose, or xylulose. In anticipation of material disclosed below, it may be appreciated that, while "a monosaccharide monomer" may be disclosed, the monosaccharide monomer may comprise a mixture of monosaccharide monomers.

Further, the copolymer may also be prepared using one or more diol monomers, including, without limitation, octane-1,3-diol, cis-oct-5-ene-1,3-diol, isosorbide, 1,3-propanediol, 1,2-propanediol, and 1,4-butanediol.

Figure 2:
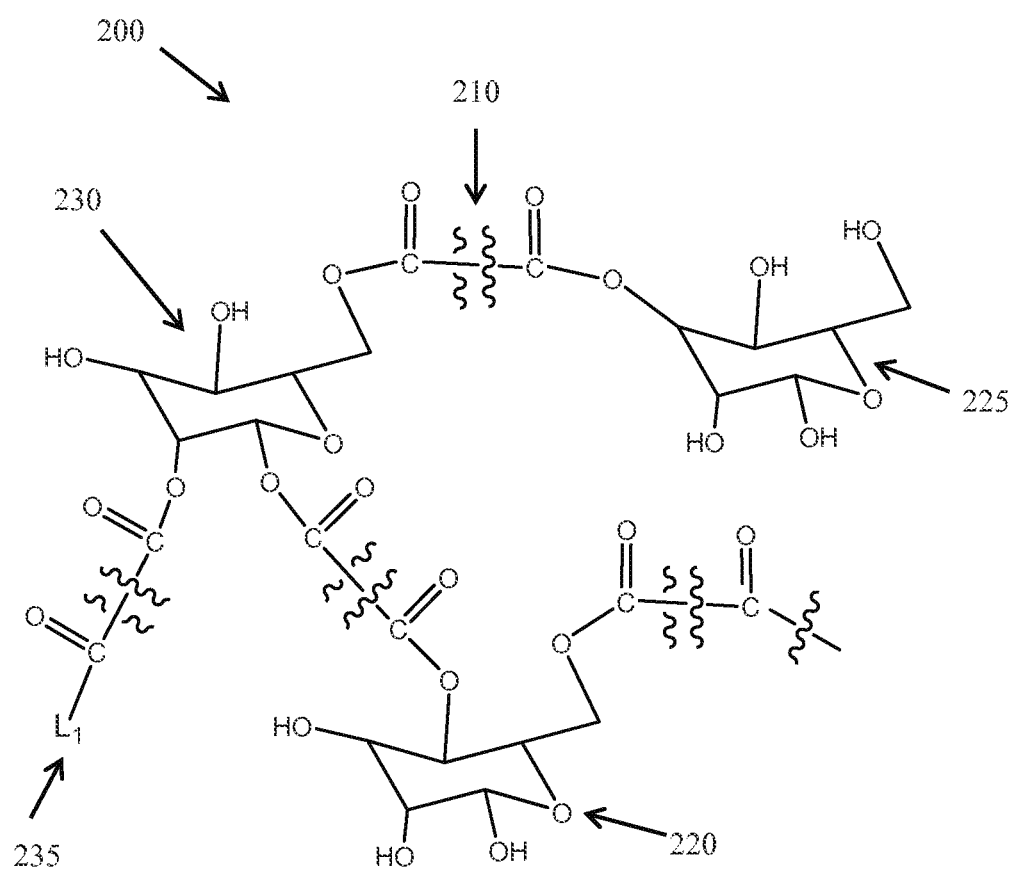
FIG. 2 illustrates an embodiment of a portion of a copolymer in accordance with the present disclosure.

FIG. 2 illustrates an embodiment of a portion 200 of the copolymer. The copolymer comprises at least one monosaccharide moiety partially cross-linked to a dicarboxylic moiety. FIG. 2 illustrates a number of monosaccharide moieties, 220, 225, and 230, cross-linked to a number of dicarboxylic moieties, such as 210. The degree of cross-linking may be variable. Thus, monosaccharide moiety 225 is cross-linked to a single dicarboxylic moiety at one carboxyl end. Monosaccharide moiety 220 is cross-linked to two separate dicarboxylic moieties; monosaccharide moiety 230 is cross-linked to three separate dicarboxylic moieties. It is possible to describe the copolymer in terms of an average number of dicarboxylic moieties cross-linked to a single monosaccharide moiety. In FIG. 2, monosaccharide moiety 225 is cross-linked to a single dicarboxylic moiety, monosaccharide moiety 220 is cross-linked to two, and monosaccharide moiety 230 is cross-linked to three dicarboxylic moieties. Thus, for the portion of the copolymer illustrated in FIG. 2, the average number of dicarboxylic moieties cross-linked to a single monosaccharide moiety is 2. In some embodiments, the average cross-linking number may be from about 1.2 to about 3.2 In other embodiments, the average cross-linking number may be from about 2.0 to about 2.6. Specific examples of the average cross-linked number include 1.2, 1.4, 1.6, 1.8, 2.0, 2.2, 2.4, 2.5, 2.6, 2.8, 3.0, 3.2, and ranges between any two of these values.

It is apparent in FIG. 2 that the cross-linking is accomplished through ester bonds formed by a carboxyl end of a dicarboxylic moiety and a hydroxyl function of a monosaccharide moiety. A dicarboxylic moiety 210 may be cross-linked to one monosaccharide moiety at one carboxyl end, and cross-linked to a second monosaccharide moiety at the second carboxyl end. Alternatively, a dicarboxylic moiety may be cross-linked to a single monosaccharide at one carboxyl end, and cross-linked to a group $L_1$ at the second carboxyl end 235. In some embodiments, $L_1$ may comprise a leaving group associated with a precursor dicarboxylic monomer. Group $L_1$ may include, without limitation, an O-aliphatic group, an O-aromatic group, an S-aliphatic group, an S-aromatic group, an N-primary amine group, or an N-secondary amine group. In some embodiments, group $L_1$ may include, without limitation, a hydroxyl group, a methoxy group, an ethoxy group, a butoxy group, an isobutoxy group, a propoxy group, an isopropoxy group, a phenoxy group, a methyl sulfide group, an ethyl sulfide group, a butyl sulfide group, an isobutyl sulfide group, a propyl sulfide group, an isobutyl sulfide group, a phenyl sulfide group, a methyl amine group, an ethyl amine group, a butyl amine group, an isobutyl amine group, a propyl amine group, an isopropyl amine group, an N,N-dimethyl amine group, an N,N-di-ethyl amine group, an N,N-dibutyl amine group, an N,N-di-isobutyl amine group, an N,N-dipropyl amine group, or an N,N-di-isopropyl amine group. Thus, in some embodiments, a group $L_1$ or $L_2$ conjugated to a precursor dicarboxylic monomer may become incorporated into the copolymer.

Figure 3:
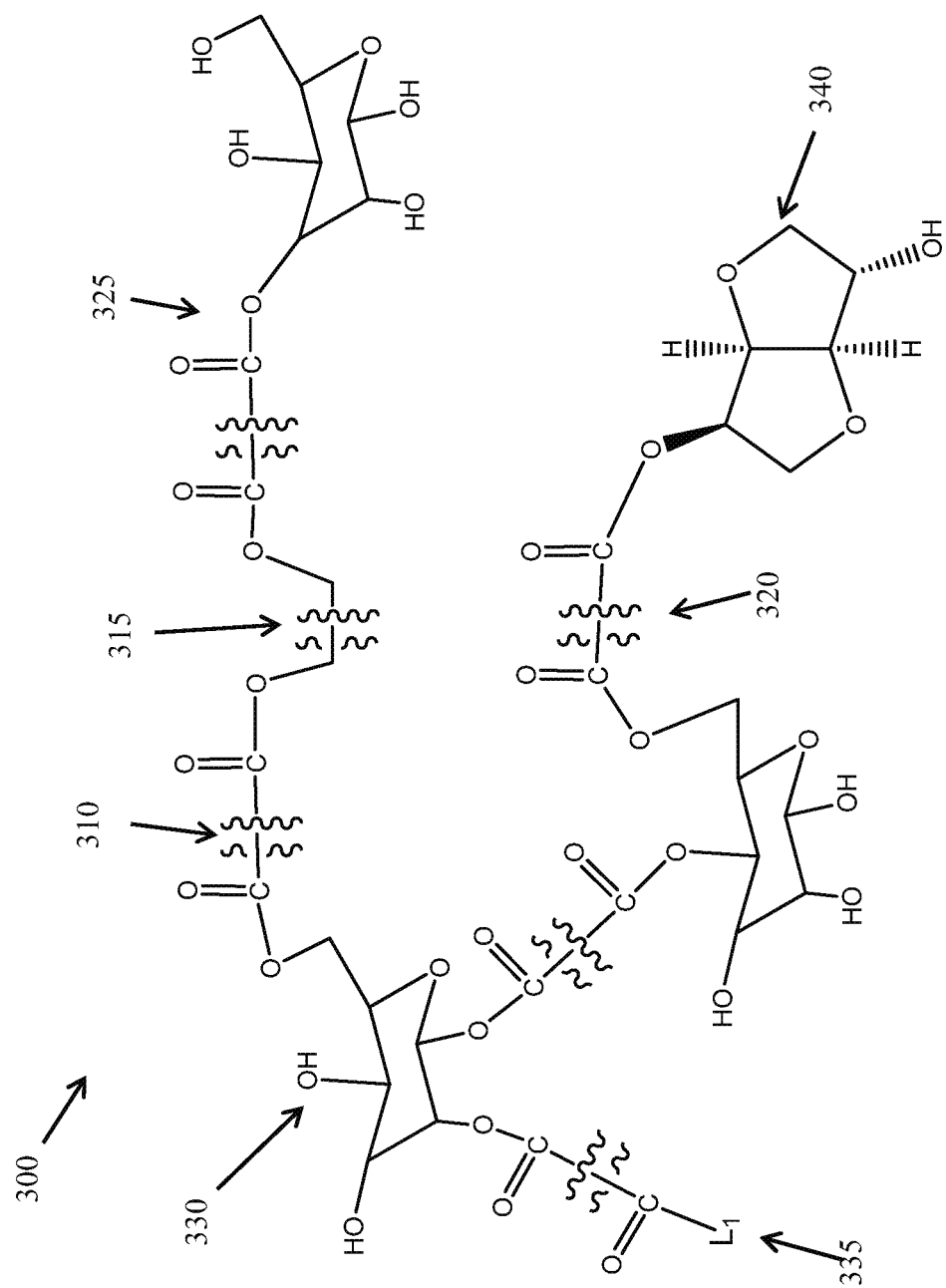
FIG. 3 illustrates another embodiment of a portion of a copolymer in accordance with the present disclosure.

FIG. 3 illustrates a portion of another embodiment of the copolymer. In particular, FIG. 3 illustrates a portion of a copolymer 300 that may be prepared from dicarboxylic monomers, monosaccharide monomers, and diol monomers. In addition to monosaccharide moieties such as 330, the copolymer may further comprise dicarboxylic moieties such as 310, 325, and 320. FIG. 3 illustrates, for example, a dicarboxylic moiety cross-linked to a first monosaccharide moiety at a first carboxyl end, and cross-linked to a second monosaccharide moiety at the second carboxyl end. FIG. 3 further illustrates a dicarboxylic moiety cross-linked to a monosaccharide 330 at one carboxyl end and cross-linked to a non-monosaccharide moiety $L_1$ at a second carboxyl end. Additionally, a dicarboxylic moiety may be cross-linked to a diol moiety, such as 310, 320, and 325. A diol moiety 315 may be cross-linked to one dicarboxylic moiety 310 at a first hydroxyl group, and cross-linked to a second dicarboxyl moiety 325 at the second hydroxyl group. Alternatively, a diol moiety 340 may be cross-linked to only one dicarboxylic moiety 320.

In one embodiment, the copolymer may be prepared as a reaction product of monosaccharide monomers and dicarboxylic monomers in the presence of at least one catalyst within a mixture. Under suitable conditions, a copolymer with adhesive properties may be produced.

In one embodiment, the monosaccharide monomers may include one or more monosaccharides, including pentose (C5) sugars, hexose (C6) sugars, or a combination of hexose and pentose sugars. Embodiments of monosaccharides may include, without limitation, allose, altrose, glucose, mannose, gulose, idose, galactose, talose, psicose, fructose, sorbose, tagatose, arabinose, lyxose, ribose, xylose, ribulose, or xylulose. It may be appreciated that the monosaccharide monomers may comprise a single type of monosaccharide or a mixture of monosaccharides.

In one embodiment, the dicarboxylic monomers may include one or more dicarboxylic monomers comprising at least a pair of carboxyl ends, each carboxyl end containing a carbonyl carbon-oxygen double bond, in which the carboxyl ends may be joined by an intermediate component. Each carboxyl end may further be conjugated to a leaving group, which may, independently, include an —O—$R_1$, an —S—$R_2$, an —NH—$R_3$, or an —N($R_4$)($R_5$) group. The leaving groups associated with the carboxyl ends may comprise the same type of leaving group, or they may differ.

Groups $R_1$-$R_5$ may comprise any of a number of organic substituents, including, but not limited to, aliphatic groups and aromatic groups. In one embodiment, either one or both of the leaving groups may include an O-aliphatic group, an O-aromatic group, an S-aliphatic group, an S-aromatic group, an N-primary amine group, or an N-secondary amine group. In one embodiment, the dicarboxylic monomer may be a dicarboxylic acid monomer. In one embodiment, the dicarboxylic monomer may be an α,ω-dicarboxylic acid monomer. In another embodiment, the dicarboxylic monomer may be a dicarboxylic acid ester monomer. In yet another embodiment, the dicarboxylic monomer may be a dicarboxylic acid methyl ester monomer. In still another embodiment, the dicarboxylic monomer may be an α,ω-dicarboxylic acid methyl ester monomer. In another embodiment, either one or both of the leaving groups may include a hydroxyl group, a methoxy group, an ethoxy group, a butoxy group, an isobutoxy group, a propoxy group, an isopropoxy group, a phenoxy group, a methyl sulfide group, an ethyl sulfide group, a butyl sulfide group, an isobutyl sulfide group, a propyl sulfide group, an isobutyl sulfide group, a phenyl sulfide group, a methyl amine group, an ethyl amine group, a butyl amine group, an isobutyl amine group, a propyl amine group, an isopropyl amine group, an N,N-dimethyl amine group, an N,N-di-ethyl amine group, an N,N-dibutyl amine group, an N,N-di-isobutyl amine group, an N,N-dipropyl amine group, or an N,N-di-isopropyl amine group.

The intermediate components of the dicarboxylic monomers may include a variety of organic groups including linear chain and branched chain groups. In one embodiment, the intermediate group may include an unsaturated linear chain. In another embodiment, the intermediate group may include a mono-unsaturated chain or a poly-unsaturated chain. In some embodiments, the liner chain may comprise "n" carbon atoms, where "n" may be an integer from about 12 to about 34. In some embodiments, "n" may be an integer from about 16 to about 20. In still another embodiment, "n" may be about 18. The integer can be an even number or an odd number. Examples of even number include 12, 14, 16, 18, 20, 22, 24, 26, 28, 30, and ranges between any two of these values. Examples of odd numbers include 13, 15, 17, 19, 21, 23, 25, 27, 29, and ranges between any two of these values.

In one embodiment, the intermediate group may comprise a poly-unsaturated linear chain including a propenyl repeat section. The propenyl moiety may be repeated "x" times within the repeat section, where "x" may be an integer from 0 to about 4. In some embodiments, "x" may be 0, 1, 2, 3, or 4.

The intermediate component may also include lengths of straight chain alkane moieties attached at either one or both ends of the propenyl repeat section. In one embodiment, an alkane moiety may have about 1 to about 14 carbons. In another embodiment, an alkane moiety may have about 7 to about 11 carbons. In still another embodiment, an alkane moiety may have about 9 carbons. Specific examples of the number of carbons include 1, 2, 3, 4, 5, 6, 7, 8, 9, 10, 11, 12, 13, 14, and ranges between any two of these values. It is understood that an alkane moiety attached at a first end of the propenyl repeat section may have the same number of carbons as an alkane moiety attached at the second end of the propenyl repeat section. Alternatively, the alkane moiety attached at a first end of the propenyl repeat section may have a different number of carbons than the alkane moiety attached at the second end of the propenyl repeat section.

In another embodiment, the intermediate component may include any number or distribution of unsaturated carbon-carbon double bonds along a linear chain. The intermediate component may further include one or more functional groups including, without limitation, an epoxy group, an alcohol group, or a pendant vinyl group. The intermediate components of the dicarboxylic monomers may include any or all of these groups, or other functional groups.

It may be appreciated that the stereo-isomeric configuration about any one of the carbon-carbon double bonds of a dicarboxylic monomer may have a cis configuration or a trans configuration (or alternatively stated, E- or Z-configuration). A poly-unsaturated dicarboxylic monomer may include cis isomers at all carbon-carbon double bonds, trans isomers at all carbon-carbon double bonds, or a combination of cis isomers at some carbon-carbon double bonds and trans isomers at the other carbon-carbon double bonds.

It may be appreciated that the dicarboxylic monomers may comprise a single type of dicarboxylic monomer or a mixture of dicarboxylic monomers.

In one embodiment, the dicarboxylic monomers and the monosaccharide monomers may be present initially in the mixture at a mole percent ratio of about 85:15 to about 65:35. In one embodiment, the dicarboxylic monomers and the monosaccharide monomers may be present initially in the mixture at a mole percent ratio of about 80:20 to about 70:30. Specific examples of the mole percent ratio include 80:20, 75:25, 70:30, 65:35, and ranges between any two of these values.

At least one catalyst may be used in the preparation of the copolymer. In one embodiment, the catalyst may comprise a strong Lewis acid. As non-limiting examples, the strong Lewis acid may comprise any one or more of hydrochloric acid, phosphoric acid, nitric acid, or sulfuric acid. In one embodiment, the catalyst may comprise phosphoric acid. In another embodiment, the catalyst may comprise a coordinating compound. Non-limiting examples of such coordinating compounds may include one or more of a first row transition metal halide, a second row transition metal halide, a third row transition metal halide, a lanthanide salt, or any combination thereof. In one embodiment, the coordinating compound may comprise ferric chloride. In another embodiment, the catalyst may comprise a combination of a strong Lewis acid and a coordinating compound. As one example, the catalyst may comprise both phosphoric acid and ferric chloride.

In one embodiment, the catalyst and the dicarboxylic monomers and may be present initially in the mixture at a weight ratio of about 1:1 to about 1:200. Specific examples of the initial weight ratio include, 1:1, 1:2, 1:5, 1:10, 1:20, 1:40, 1:60, 1:80, 1:100, 1:120, 1:140, 1:160, 1:180, 1:200, and ranges between any two of these values. In one embodiment, a strong Lewis acid catalyst and the dicarboxylic monomers may be present initially in the mixture at a weight ratio of about 1:2. In another embodiment, a coordinating compound catalyst and the dicarboxylic monomers may be present initially in the mixture at a weight ratio of about 1:10.

In one embodiment of a method of preparing the copolymer, the monosaccharide monomers, the dicarboxylic monomers, and catalyst may be present as a mixture in one or more mixing vessels. In an embodiment, the mixture may be mixed under suitable conditions. In another embodiment, the mixture may be stirred continuously. In still another embodiment, the mixture may be shaken within the one or more vessels. Alternative methods to combine and contact the components of the mixture may also be anticipated by this disclosure.

Under suitable conditions, a copolymer with adhesive properties may be produced as a reaction product of the mixture of monosaccharide monomers, dicarboxylic monomers, and catalyst. Suitable conditions may include heating the mixture at a specified temperature for a specified period of time. In one embodiment, the mixture may be heated at a first temperature of about 60° C. to about 180° C. In one embodiment, the mixture may be heated at a first temperature of about 80° C. to about 160° C. Specific examples of the first temperature include, 60° C., 80° C., 100° C., 120° C., 140° C., 150° C., 160° C., 180° C., and ranges between any two of these values. In still another embodiment, the mixture may be heated at a first temperature of about 150° C. In an embodiment, the mixture may be heated at a first temperature for a period of time of about 1 hour to about 12 hours. In another embodiment, the mixture may be heated at a first temperature for a period of time of about 1.5 hours to about 10 hours. Specific examples of the period of time include, 1 hour, 1.5 hours, 2 hours, 3 hours, 4 hours, 5 hours, 6 hours, 8 hours, 10 hours, 12 hours, and ranges between any two of these values. In yet another embodiment, the mixture may be heated at a first temperature for about 2 hours.

Suitable conditions may further include heating the mixture at a second specified temperature for a second specified period of time. In one embodiment, the mixture may be heated at a second temperature of about 150° C. to about 220° C. In one embodiment, the mixture may be heated at a second temperature of about 160° C. to about 210° C. Specific examples of the second temperature include 150° C., 160° C., 170° C., 180° C., 190° C., 200° C., 210° C., and ranges between any two of these values. In still another embodiment, the mixture may be heated at a second temperature of about 200° C. In an embodiment, the mixture may be heated at a second temperature for a period of time of about 1 minute to about 60 minutes. In another embodiment, the mixture may be heated at a second temperature for a period of time of about 3 minutes to about 30 minutes. Specific examples of a period of time include 1 minute, 2 minutes, 3 minutes, 5 minutes, 10 minutes, 15 minutes, 20 minutes, 30 minutes, 40 minutes, 45 minutes, 50 minutes, 60 minutes, and ranges between any two of these values. In yet another embodiment, the mixture may be heated at a second temperature for about 5 minutes.

In another embodiment, the copolymer may be prepared as a reaction product of diol monomers, dicarboxylic monomers, and monosaccharide monomers. A first mixture may be prepared by contacting the diol monomers and dicarboxylic monomers in the presence of at least one catalyst. The first mixture may then be placed under a first set of conditions. Thereafter, the first mixture may be contacted with monosaccharide monomers to form a second mixture. Under a suitable set of second conditions, a copolymer with adhesive properties may be produced from the second mixture.

In one embodiment, the monosaccharide monomers may include one or more monosaccharides, including pentose (C5) sugars, hexose (C6) sugars, or a combination of hexose and pentose sugars. Embodiments of monosaccharides may include, without limitation, substantially the group of monosaccharides as disclosed above. It may be appreciated that the monosaccharide monomers may comprise a single type of monosaccharide or a mixture of monosaccharides.

In one embodiment, the dicarboxylic monomers may include one or more dicarboxylic monomers comprising at least a pair of carboxyl ends, each carboxyl end containing a carbonyl carbon-oxygen double bond, in which the carboxyl ends may be joined by an intermediate component. Embodiments of the intermediate components may include, without limitation, the group of intermediate components as substantially disclosed above. Each carboxyl end may further be conjugated to a leaving group, which may include an —O—$R_1$, an —S—$R_2$, an —NH—$R_3$, or an —N($R_4$)($R_5$) group. The leaving groups associated with the carboxyl ends may comprise the same type of leaving group, or they may differ. Embodiments of groups $R_1$-$R_5$ may include, without limitation, the groups of $R_1$-$R_5$ as substantially disclosed above.

In one embodiment, the diol monomers may include, without limitation, octane-1,3-diol, cis-oct-5-ene-1,3-diol, isosorbide, 1,3-propanediol, 1,2-propanediol, and 1,4-butanediol.

At least one catalyst may be used in the preparation of the copolymer. Embodiments of catalysts may include, without limitation, the groups of catalysts as substantially disclosed above.

In one embodiment, the dicarboxylic monomers and the diol monomers may be present initially in the first mixture at a mole percent ratio of about 85:3 to about 65:30. In one embodiment, the dicarboxylic monomers and the diol monomers may be present initially in the first mixture at a mole percent ratio of about 85:3 to about 85:12. In another embodiment, the dicarboxylic monomers and the diol monomers may be present initially in the first mixture at a mole percent ratio of about 65:5 to about 65:30. Specific examples of a mole percent ratio include 85:5, 85:7, 85:9, 85:10, 65:5, 65:10, 65:15, 65:20, 65:25, 80:4, 80:8, 80:12, 80:16, 75:5, 75:10, 75:15, 75:21, 70:5, 70:10, 70:15, 70:20, 70:25, and ranges between any two of these values. In yet another embodiment, the dicarboxylic monomers and the diol monomers may be present initially in a first mixture at a mole percent ratio of about 75:4.

In one embodiment, the catalyst and the dicarboxylic monomers and may be present initially in the first mixture at a weight ratio of about 1:1 to about 1:200. Specific examples of the initial weight ratio include 1:1, 1:2, 1:5, 1:10, 1:20, 1:40, 1:60, 1:80, 1:100, 1:120, 1:140, 1:160, 1:180, 1:200, and ranges between any two of these values. In one embodiment, a strong Lewis acid catalyst and the dicarboxylic monomers may be present initially in the first mixture at a weight ratio of about 1:2. In another embodiment, a coordinating compound catalyst and the dicarboxylic monomers may be present initially in the first mixture at a weight ratio of about 1:10.

During the preparation of the copolymer, the diol monomers, the dicarboxylic monomers, and catalyst may be present as a first mixture in one or more mixing vessels. In an embodiment, the first mixture may be mixed under suitable conditions. In another embodiment, the first mixture may be stirred continuously. In still another embodiment, the first mixture may be shaken within the one or more vessels. Alternative methods to combine and contact the components of the first mixture may also be anticipated by this disclosure.

The first mixture may be exposed to a first set of conditions. The first set of conditions may include heating the first mixture at least at a first specified temperature for a first specified period of time. In one embodiment, the first mixture may be heated at a temperature of about 60° C. to about 180° C. In one embodiment, the first mixture may be heated at a temperature of about 80° C. to about 160° C. Specific examples of the first temperature include, 60° C., 80° C., 100° C., 120° C., 140° C., 150° C., 160° C., 180° C., and ranges between any two of these values. In still another embodiment, the first mixture may be heated at a temperature of about 150° C. In an embodiment, the first mixture may be heated for a period of time of about 1 hour to about 12 hours. In another embodiment, the first mixture may be heated for a period of time of about 1.5 hours to about 10 hours. Specific examples of the period of time include 1 hour, 1.5 hours, 2 hours, 3 hours, 4 hours, 5 hours, 6 hours, 8 hours, 10 hours, 12 hours, and ranges between any two of these values. In yet another embodiment, the first mixture may be heated for about 2 hours.

The first mixture may then be contacted with monosaccharide monomers to form a second mixture. In an embodiment, the second mixture may be mixed under suitable conditions. In another embodiment, the second mixture may be stirred continuously. In still another embodiment, the second mixture may be shaken within one or more vessels. It is understood that the vessel or vessels containing the second mixture may be the same vessel or vessels that contained the first mixture. Alternatively, the second mixture may be contained in one or more additional or alternative vessels. Alternative methods to combine and contact the components of the second mixture may also be anticipated by this disclosure.

In one embodiment, the dicarboxylic monomers and the diol monomers present initially in the first mixture, and the monosaccharide monomers present initially in the second mixture may be present at a mole percent ratio of dicarboxylic monomer to the total of the monosaccharide monomer plus diol monomer from about 85:15 to about 65:35. In one embodiment, the dicarboxylic monomers and the diol monomers present initially in the first mixture, and the monosaccharide monomers present initially in the second mixture may be present at a mole percent ratio of dicarboxylic monomer to the total of the monosaccharide monomer plus diol monomer from about 80:20 to about 70:30. Specific examples of the mole percent ratio of dicarboxylic monomer to the total of the monosaccharide monomer plus diol monomer include 80:20, 75:25, 70:30, 65:35, and ranges between any two of these values. In yet another embodiment, the dicarboxylic monomers and the diol monomers present initially in the first mixture, and the monosaccharide monomers present initially in the second mixture may be present at a mole percent ratio of dicarboxylic monomer to the total of the monosaccharide monomer plus diol monomer from about 75:25.

Under suitable conditions, a copolymer with adhesive properties may be produced as a reaction product of the second mixture. Suitable conditions may include heating the second mixture at a specified temperature for a specified period of time. In one embodiment, the second mixture may be heated at a first temperature of about 60° C. to about 180° C. In one embodiment, the second mixture may be heated at a first temperature of about 80° C. to about 160° C. Specific examples of the first temperature include 60° C., 80° C., 100° C., 120° C., 140° C., 150° C., 160° C., 180° C., and ranges between any two of these values. In still another embodiment, the second mixture may be heated at a first temperature of about 150° C. In an embodiment, the second mixture may be heated at a first temperature for a period of time of about 1 hour to about 12 hours. In another embodiment, the second mixture may be heated at a first temperature for a period of time of about 1.5 hours to about 10 hours. Specific examples of the period of time include 1 hour, 1.5 hours, 2 hours, 3 hours, 4 hours, 5 hours, 6 hours, 8 hours, 10 hours, 12 hours, and ranges between any two of these values. In yet another embodiment, the mixture may be heated at a first temperature for about 2 hours.

Suitable conditions may further include heating the second mixture at a second specified temperature for a second specified period of time. In one embodiment, the second mixture may be heated at a second temperature of about 150° C. to about 220° C. In one embodiment, the second mixture may be heated at a second temperature of about 160° C. to about 210° C. Specific examples of the second temperature include 150° C., 160° C., 170° C., 180° C., 190° C., 200° C., 210° C., and ranges between any two of these values. In still another embodiment, the second mixture may be heated at a second temperature of about 200° C. In an embodiment, the second mixture may be heated at a second temperature for a period of time of about 1 minute to about 60 minutes. In another embodiment, the second mixture may be heated at a second temperature for a period of time of about 3 minutes to about 30 minutes. Specific examples of a period of time include 1 minute, 2 minutes, 3 minutes, 5 minutes, 10 minutes, 15 minutes, 20 minutes, 30 minutes, 40 minutes, 45 minutes, 50 minutes, 60 minutes, and ranges between any two of these values. In yet another embodiment, the second mixture may be heated at a second temperature for about 5 minutes.

EXAMPLES

Example 1

A Copolymer Adhesive Material

A copolymer adhesive material may be prepared by mixing about 84 grams of a mixture of C5/C6 monosaccharides comprising about 26.4% arabinose, about 50.4% galactose, about 15.6% xylose, and about 7.6% glucose (monosaccharide monomers), 10 grams of α,ω-(9Z)-octadec-9-enedioic acid dimethyl ester (dicarboxylic monomer), 5 grams of phosphoric acid (strong Lewis acid catalyst), and 1 gram of ferric chloride (coordinating compound catalyst) in an oil-jacketed stainless steel sigma-blade mixer. The mixture may be continuously stirred while heated at about 150° C. for about 2 hours. Thereafter, the mixture may be heated to at least 200° C. for about 2 minutes. The resulting copolymer material may be a dry amorphous solid similar to common poly-vinyl acetate-based glues. The adhesive material may have a melting point of about −15° C. and a tensile strength of about 380 psi (2.62 MPa).

Example 2

A Method of Preparing a First Copolymer Adhesive Material

To an oil jacketed stainless steel sigma-blade mixer may be added about 84 grams of a mixture of C5/C6 monosaccharides comprising about 26.4% arabinose, about 50.4% galactose, about 15.6% xylose, and about 7.6% glucose (monosaccharide monomer), 10 grams of α,ω-(9Z)-octadec-9-enedioic acid dimethyl ester (dicarboxylic monomer), 5 grams of phosphoric acid (strong Lewis acid catalyst), and 1 gram of ferric chloride (coordinating compound catalyst). The mixture may be continuously stirred while heated at about 150° C. for about 2 hours. Thereafter, the mixture may be heated to at least 200° C. for about 2 minutes.

Example 3

A Method of Preparing a Second Copolymer Adhesive Material

To an oil jacketed stainless steel sigma-blade mixer may be added 4.3 grams of isosorbide (diol monomer), 10 grams of α,ω-(9Z)-octadec-9-enedioic acid dimethyl ester (dicarboxylic monomer), 5 grams of phosphoric acid (strong Lewis acid catalyst), and 1 gram of ferric chloride (coordinating compound catalyst) to form a first mixture. The first mixture may be continuously stirred while heated at about 150° C. for about 2 hours. Thereafter, 79.7 grams of a mixture of C5/C6 monosaccharides comprising about 26.4% arabinose, about 50.4% galactose, about 15.6% xylose, and about 7.6% glucose (monosaccharide monomer) may be added to the first mixture, thereby creating a second mixture. The second mixture may then be heated for another 2 hours at 150° C. under continuous stirring. After this first period of time, the mixture may be heated further to at least 200° C. for about 2 minutes.

Example 4

Use of a Copolymer Adhesive Material for Binding Wood Pulp-Based Products

One piece of a wood pulp-based product, such as bond paper, cardboard, or fiberboard, may be coated on one side with a thin layer of a copolymer adhesive. A second piece a wood pulp-based product may be pressed against the layer of adhesive and held in fixed position until the adhesive dries at ambient temperature, about 68° F. (20° C.) to about 79° F. (26° C.). It is understood that the two pieces of wood pulp-based material may be the same or may differ. The dried copolymer adhesive may have a lap shear strength of about 400 psi (2.76 MPa). Compared to other common adhesives, the copolymer adhesive disclosed above may be produced entirely from renewable resources, and may not require feedstocks from petrochemical sources.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated in this disclosure, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions, which can, of course, vary. It is also to be understood that the terminology used in this disclosure is for the purpose of describing particular embodiments only, and is not intended to be limiting.

With respect to the use of substantially any plural and/or singular terms in this disclosure, those having skill in the art can translate from the plural to the singular and/or from the singular to the plural as is appropriate to the context and/or application. The various singular/plural permutations may be expressly set forth in this disclosure for sake of clarity. It will be understood by those within the art that, in general, terms used in this disclosure, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed in this disclosure also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed in this disclosure can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member.

From the foregoing, it will be appreciated that various embodiments of the present disclosure have been described for purposes of illustration, and that various modifications may be made without departing from the scope and spirit of the present disclosure. Accordingly, the various embodiments disclosed are not intended to be limiting, with the true scope and spirit being indicated by the following claims.

What is claimed is:

1. A composition comprising an adhesive copolymer, wherein the adhesive copolymer is a reaction product of a first mixture and a monosaccharide monomer,
    wherein the first mixture is a reaction product of a diol monomer and a dicarboxylic monomer,
    wherein the dicarboxylic monomer and the diol monomer in the first mixture and the monosaccharide monomer are at a mole percent ratio of the dicarboxylic monomer to a total of the monosaccharide monomer and the diol monomer of about 85:15 to about 65:35, and
    wherein the adhesive copolymer comprises at least one dicarboxyl moiety including an epoxy group.

2. The composition of claim 1, wherein the monosaccharide monomer is a pentose (C5) sugar, a hexose (C6) sugar, or a combination thereof.

3. The composition of claim 1, wherein the monosaccharide monomer comprises one or more of the following: allose, altrose, glucose, mannose, gulose, idose, galactose, talose, psicose, fructose, sorbose, tagatose, arabinose, lyxose, ribose, xylose, ribulose, and xylulose.

4. The composition of claim 1, wherein the dicarboxylic monomer is a dicarboxylic acid monomer.

5. The composition of claim 1, wherein the dicarboxylic monomer is an α,ω-dicarboxylic acid monomer.

6. The composition of claim 1, wherein the dicarboxylic monomer is a dicarboxylic acid ester monomer.

7. The composition of claim 1, wherein the dicarboxylic monomer is a dicarboxylic acid methyl ester monomer.

8. The composition of claim 1, wherein the dicarboxylic monomer is an α,ω-dicarboxylic acid methyl ester monomer.

9. The composition of claim 1, wherein the dicarboxylic monomer comprises one or more of the following: a dicarboxylic dimethyl ester, a dicarboxylic di-ethyl ester, a dicarboxylic dipropyl ester, a dicarboxylic di-isopropyl ester, a dicarboxylic dibutyl ester, a dicarboxylic di-isobutyl ester, a dicarboxylic methyl-ethyl ester, a dicarboxylic methyl-propyl ester, a dicarboxylic methyl-isopropyl ester, a dicarboxylic methyl-butyl ester, a dicarboxylic methyl-isobutyl ester, a dicarboxylic ethyl-propyl ester, a dicarboxylic ethyl-isopropyl ester, a dicarboxylic ethyl-butyl ester, a dicarboxylic ethyl-isobutyl ester, a dicarboxylic propyl-isopropyl ester, a dicarboxylic propyl-butyl ester, a dicarboxylic propyl-isobutyl ester, a dicarboxylic isopropyl-butyl ester, a dicarboxylic isopropyl-isobutyl ester, and a dicarboxylic butyl-isobutyl ester.

10. The composition of claim 1, wherein the dicarboxylic monomer comprises a linear chain of "n" carbon atoms, where "n" is an integer of about 12 to about 34.

11. The composition of claim 1, wherein the dicarboxylic monomer comprises a linear chain of "n" carbon atoms, where "n" is an integer of about 16 to about 20.

12. The composition of claim 1, wherein the dicarboxylic monomer comprises a linear chain of "n" carbon atoms, where "n" is 18.

13. The composition of claim 1, wherein the adhesive copolymer comprises at least one monosaccharide moiety crosslinked to a plurality of dicarboxyl moieties.

14. The composition of claim 1 wherein the adhesive copolymer comprises at least one dicarboxyl moiety cross-linked at a first carboxyl end to a first monosaccharide moiety and at a second carboxyl end to a second monosaccharide moiety.

15. The composition of claim 1, wherein the adhesive copolymer comprises at least one dicarboxyl moiety cross-linked at a carboxyl end to one of the following groups: an O-aliphatic group, an O-aromatic group, an S-aliphatic group, an S-aromatic group, an N-primary amine, and an N-secondary amine.

16. The composition of claim 1, wherein the adhesive copolymer comprises at least one dicarboxyl moiety cross-linked at a carboxyl end to one of the following: a methoxy group, an ethoxy group, a butoxy group, an isobutoxy group, a propoxy group, an isopropoxy group, a phenoxy group, a methyl sulfide group, an ethyl sulfide group, a butyl sulfide group, an isobutyl sulfide group, a propyl sulfide group, an isobutyl sulfide group, a phenyl sulfide group, a methyl amine group, an ethyl amine group, a butyl amine group, an isobutyl amine group, a propyl amine group, an isopropyl amine group, an N,N-dimethyl amine group, an N,N-di-ethyl amine group, an N,N-dibutyl amine group, an N,N-di-isobutyl amine group, an N,N-dipropyl amine group, and an N,N-di-isopropyl amine group.

17. The composition of claim 1, wherein the adhesive copolymer comprises at least a first dicarboxyl moiety cross-linked at a first carboxyl end to a first hydroxyl group of a diol moiety, and at least a second dicarboxyl moiety cross-linked at a first carboxyl end to a second hydroxyl group of the diol moiety.

18. The composition of claim 17, wherein the diol moiety comprises one or more of the following: an octane-1,3-diol moiety, a cis-oct-5-ene-1,3-diol moiety, an isosorbide moiety, a 1,3-propanediol moiety, a 1,2-propanediol moiety, and a 1,4-butanediol moiety.

19. The composition of claim 1, wherein the adhesive copolymer comprises about 1.2 to about 3.2 dicarboxyl moieties cross-linked to a single monosaccharide moiety.

20. The composition of claim 1, wherein the adhesive copolymer comprises about 2.0 to about 2.6 dicarboxyl moieties cross-linked to a single monosaccharide moiety.

21. The composition of claim 1, wherein the adhesive copolymer comprises 2.5 dicarboxyl moieties cross-linked to a single monosaccharide moiety.

* * * * *